United States Patent
Bialer et al.

(10) Patent No.: US 11,668,789 B2
(45) Date of Patent: Jun. 6, 2023

(54) ROBUST REFLECTION POINT DETECTION

(71) Applicant: GM GLOBAL TECHNOLOGY OPERATIONS LLC, Detroit, MI (US)

(72) Inventors: Oded Bialer, Petah Tivak (IL); Amnon Jonas, Jerusalem (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 265 days.

(21) Appl. No.: 17/123,414

(22) Filed: Dec. 16, 2020

(65) Prior Publication Data
US 2022/0187418 A1   Jun. 16, 2022

(51) Int. Cl.
| | |
|---|---|
| G01S 7/285 | (2006.01) |
| G01S 13/06 | (2006.01) |
| G01S 13/58 | (2006.01) |
| G01S 13/931 | (2020.01) |
| G01S 13/00 | (2006.01) |

(52) U.S. Cl.
CPC .............. *G01S 7/285* (2013.01); *G01S 13/06* (2013.01); *G01S 13/58* (2013.01); *G01S 13/931* (2013.01)

(58) Field of Classification Search
None
See application file for complete search history.

(56) References Cited

U.S. PATENT DOCUMENTS

| | | | | |
|---|---|---|---|---|
| 5,430,690 | A * | 7/1995 | Abel | G01R 23/16 367/136 |
| 5,481,270 | A * | 1/1996 | Urkowitz | G01S 13/582 342/39 |
| 6,577,267 | B1 * | 6/2003 | Moedl | G01S 13/60 702/143 |
| 9,121,943 | B2 * | 9/2015 | Stirling-Gallacher | G01S 13/888 |
| 10,768,293 | B2 * | 9/2020 | Mizutani | G01S 13/931 |
| 10,976,411 | B2 * | 4/2021 | Bialer | G01S 13/42 |
| 2005/0156780 | A1 * | 7/2005 | Bonthron | G01S 13/931 342/134 |
| 2005/0225481 | A1 * | 10/2005 | Bonthron | G01S 13/931 342/175 |

* cited by examiner

*Primary Examiner* — Bernarr E Gregory
(74) *Attorney, Agent, or Firm* — Cantor Colburn LLP

(57) ABSTRACT

A radar system and method include a sparse array receive element and a processing device. The system performs a beamforming operation on a received radar signal to generate a beamforming spectrum, which contains superposed impulse responses with relative power and angle. The processing device executes an iterative detection routine, starting with a first stage detection that compares the beamforming spectrum to an active power threshold and identifies tentative detection points. In the second stage detection, the processing device determines a certain detection point with the greatest relative power and updates the active power threshold for subsequent iterations of the detection routine. The update involves centering the impulse response related to the certain detection point around its angle, multiplying the relative power by the impulse response, and summing the product with the active power threshold. This process continues until a final set of detection points is obtained.

20 Claims, 3 Drawing Sheets

ROBUST REFLECTION POINT DETECTION

INTRODUCTION

The subject disclosure relates to radar systems.

Vehicles (e.g., automobiles, trucks, aircraft, construction equipment, farm equipment, factory equipment, whether user or autonomously operated) may be equipped with detection systems for monitoring surrounding environments. An example detection system may include radar devices that are used for detecting objects/obstacles, tracking objects, and avoiding obstacles. Radar devices may also be used in vehicles to alert a user (e.g., driver or passenger) and/or to take evasive action.

Radar devices may include a number of antennas along a given aperture. Sparse arrays may provide a high resolution at low cost and complexity due to a relatively small number of antennas. However, a sparse array may result in high side-lobes in the array beam pattern. High side-lobes may result in a high probability of false 'ghosts' detections for low threshold cases and/or high miss detection probability for high threshold cases. Accordingly, a detection system and method that is robust to high side-lobes in a radar impulse response (e.g., the array beam pattern) and provides low miss detection probability and low false 'ghost' detection probability is desired.

SUMMARY

In one exemplary embodiment, a radar system may include a radar device having a sparse array receive element receiving a return radar signal and a processing device subjecting the return radar signal to a beamforming operation to produce a beamforming spectrum including superposed impulse responses with relative power and angle, each impulse response including a respective main lobe and respective side lobes. The processing device further comparing the beam forming spectrum to a first power threshold and determining first tentative detection points as peak power points in the beamforming spectrum exceeding the first power threshold at respective angles, determining a first certain detection point as the one of the first tentative detection points having the greatest relative power, generating an updated threshold including centering the impulse response related to the first certain detection point around the angle of the first certain detection point, multiplying the relative power of the first certain detection point by the impulse response related to the first certain detection point, and summing the product with the first power threshold. The processing device further comparing the beamforming spectrum to the updated power threshold and determining second tentative detection points as peak power points of the beamforming spectrum exceeding the updated power threshold at respective angles, and determining a second certain detection point as the one of the second tentative detection points having the greatest relative power.

In addition to one or more of the features described herein, the radar system may further include the processing device storing the first certain detection point and the second certain detection point in a memory.

In addition to one or more of the features described herein, the first certain detection point may correspond to a first target and the second certain detection point may correspond to a second target.

In addition to one or more of the features described herein, the beamforming spectrum may include two superposed impulse responses wherein the first tentative detection points may correspond to main lobes of both impulse responses and the second tentative detection points may correspond to the main lobe of one of the impulse responses.

In addition to one or more of the features described herein, the first certain detection point may correspond to one of the two impulse responses and the second certain detection point may correspond to the other of the two impulse responses.

In addition to one or more of the features described herein, multiplying the relative power of the first certain detection point by the impulse response related to the first certain detection point may include multiplying by the main lobe of the impulse response related to the first certain detection point.

In addition to one or more of the features described herein, multiplying the relative power of the first certain detection point by the impulse response related to the first certain detection point may include multiplying by the side lobes of the impulse response related to the first certain detection point.

In addition to one or more of the features described herein, the first power threshold may include a fixed power threshold at all angles of the beamforming spectrum.

In another exemplary embodiment, radar system may include a radar device having a sparse array receive element receiving a return radar signal and a processing device. The processing device may be configured to subject the return radar signal to a beamforming operation to produce a beamforming spectrum including superposed impulse responses with relative power and angle, each impulse response having a respective main lobe and respective side lobes. The processing device may be further configured to iteratively execute a detection routine including performing a first stage detection including comparing the beamforming spectrum to an active power threshold and determining tentative detection points as peak power points in the beamforming spectrum exceeding the active power threshold at respective angles, performing a second stage detection including determining a certain detection point as the one of the tentative detection points having the greatest relative power, and updating the active power threshold for a subsequent iterative execution of the detection routine by centering the impulse response related to the certain detection point around the angle of the certain detection point, multiplying the relative power of the certain detection point by the impulse response related to the certain detection point, and summing the product with the active power threshold.

In addition to one or more of the features described herein, the detection routine further includes storing the certain detection point in a memory.

In addition to one or more of the features described herein, each impulse response may correspond to a respective target.

In addition to one or more of the features described herein, the tentative detection points may correspond to lobes of the impulse responses.

In addition to one or more of the features described herein, multiplying the relative power of the certain detection point by the impulse response related to the certain detection point may include multiplying by the main lobe of the impulse response related to the certain detection point.

In addition to one or more of the features described herein, multiplying the relative power of the certain detection point by the impulse response related to the certain detection point may include multiplying by the side lobes of the impulse response related to the certain detection point.

In addition to one or more of the features described herein, the active power threshold during a first iterative execution of the detection routine may include a fixed power threshold at all angles of the beamforming spectrum.

In yet another exemplary embodiment, a method of object detection with a radar system may include receiving a return radar signal with a radar device having a sparse array receive element, subjecting the return radar signal to a beamforming operation to produce a beamforming spectrum including superposed impulse responses having relative power and angle, each impulse response including a respective main lobe and respective side lobes. The method may further include comparing the beam forming spectrum to a first power threshold and determining first tentative detection points as peak power points in the beamforming spectrum exceeding the first power threshold at respective angles, determining a first certain detection point as the one of the first tentative detection points having the greatest relative power, generating an updated threshold including centering the impulse response related to the first certain detection point around the angle of the first certain detection point, multiplying the relative power of the first certain detection point by the impulse response related to the first certain detection point, and summing the product with the first power threshold, comparing the beamforming spectrum to the updated power threshold and determining second tentative detection points as peak power points of the beamforming spectrum exceeding the updated power threshold at respective angles, and determining a second certain detection point as the one of the second tentative detection points having the greatest relative power.

In addition to one or more of the features described herein, the method may further include storing the first certain detection point and the second certain detection point in a memory.

In addition to one or more of the features described herein, the first certain detection point may correspond to a first target and the second certain detection point may correspond to a second target.

In addition to one or more of the features described herein, the beamforming spectrum may include two superposed impulse responses, and the first tentative detection points may correspond to main lobes of both impulse responses and the second tentative detection points may correspond to the main lobe of one of the impulse responses.

In addition to one or more of the features described herein, the first power threshold may include a fixed power threshold at all angles of the beamforming spectrum.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
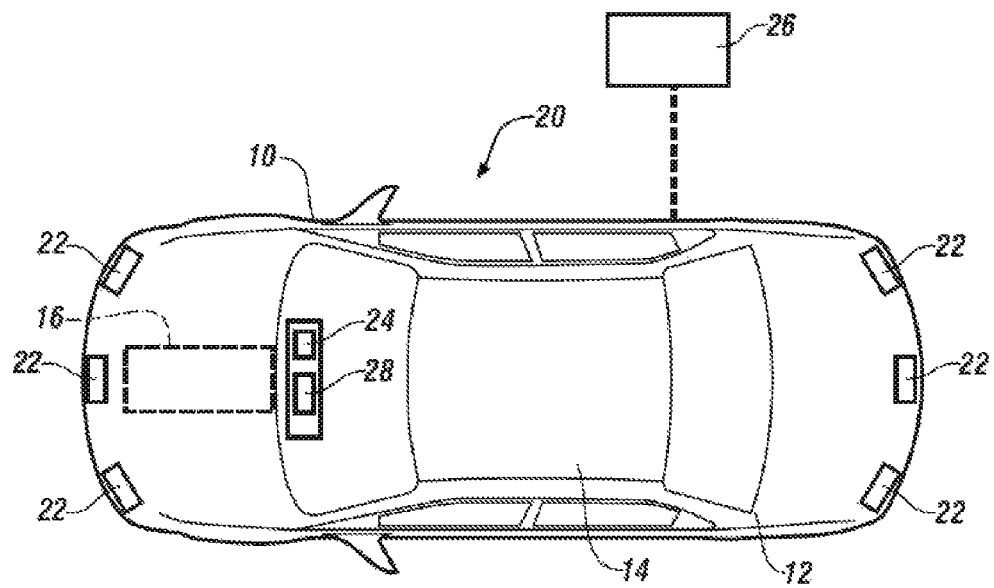
FIG. 1 depicts a vehicle including a radar system, in accordance with one or more embodiments.

The following description is merely exemplary in nature and is not intended to limit the present disclosure, its application or uses. It should be understood that throughout the drawings, corresponding reference numerals indicate like or corresponding parts and features.

In accordance with one or more exemplary embodiments, methods and systems for detection of accurate reflection points in the presence of high side-lobes are described herein. More particularly, a detection system and method is described herein that is robust to high side-lobes in a radar impulse response and provides low miss detection probability and low false 'ghost' detection probability.

For example, the detection system and method may be based on successively estimating reflection points from strongest to weakest, while adapting a detection threshold in each iteration according to the previous detections and a radar impulse response's shape. In this regard, the detection system and method achieve low miss detection and low false detection rates when a minimal number of antenna elements produce high side-lobes and in the case of a sparse array with high resolution.

FIG. 1 shows an embodiment of a vehicle 10, which includes a vehicle body 12 defining, at least in part, an occupant compartment 14. The vehicle 10, while shown in FIG. 1 as an automobile, may be any truck, aircraft, construction equipment, farm equipment, factory equipment, etc. whether user or autonomously operated. Thus, the vehicle and the vehicle body 12 are not limiting.

The vehicle body 12 may support various vehicle subsystems including an engine assembly 16, and other subsystems to support functions of the engine assembly 16 and other vehicle components, such as a braking subsystem, a steering subsystem, a fuel injection subsystem, an exhaust subsystem and others.

The vehicle 10 includes one or more aspects of a detection system 20 for detecting objects/obstacles, tracking objects, and avoiding obstacles, which may be used to alert a user, perform avoidance maneuvers, assist with user control, and/or assist with autonomously controlling the vehicle 10. The detection system 20 includes one or more radar sensing assemblies 22 (e.g., radar devices), each of which may include one or more transmit elements and/or one or more receive elements (e.g., a sparse array with an average spacing between the antennas being larger than half a wavelength). The vehicle 10 may incorporate a plurality of radar sensing assemblies 22 disposed at various locations of the vehicle body 12 and having various angular directions, as shown in FIG. 1.

An embodiment of the detection system 20 is configured to estimate a position and/or velocity of an object. An object may be any feature or condition that reflects transmitted radar signals, such as other vehicles, people, road signs, trees, road features, road obstructions, and others.

For example, each radar sensing assembly 22 includes a transmit portion and a receive portion. The transmit and receive portions may include separate transmit and receive arrays or share arrays in transceiver configurations. Each radar sensing assembly 22 may include components and features, such as a sparse array, a low pass filter (LPF), a controller, and/or other processing device. Further, each radar sensing assembly 22 via the controller, and/or other processing device executes one or more software or firmware programs, a combinational logic circuit, and/or other suitable components that provide the described functionality.

The radar sensing assemblies 22 communicate with one or more processing devices, such as processing devices in each assembly and/or a remote processing device such as an on-board processor 24 and/or a remote processor 26. The remote processor 26 may be part of, for example, a mapping system or vehicle diagnostic system. The vehicle 10 may also include a user interaction system 28 and other components such as a GPS device.

The detection system 20 is configured generally to acquire radar signals and to process and analyze the radar signals to estimate a position and/or a velocity of an object. The position and/or velocity are estimated by integrating acquired signal pulses over a selected time frame. The length of the time frame is selected to provide for a desired resolution. As discussed further below, the detection system 20 provides the detection of accurate reflection points in the presence of high side-lobes. More particularly, the detection system 20 is robust to high side-lobes and provides low miss detection probability and low false 'ghost' detection probability.

Figure 2:
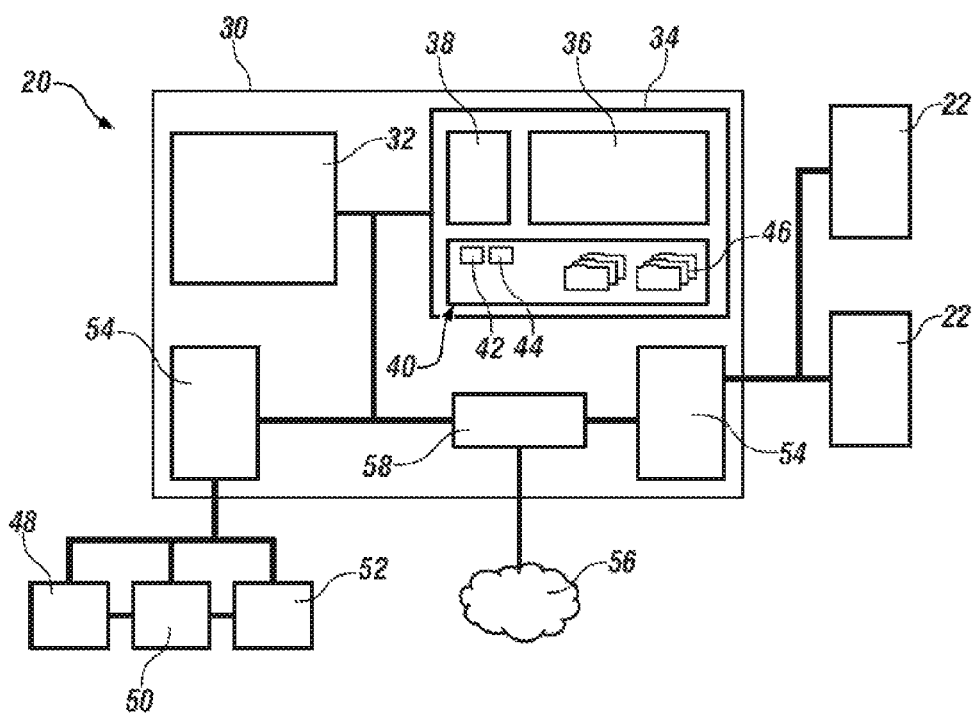
FIG. 2 depicts a radar system, in accordance with one or more embodiments.

FIG. 2 illustrates aspects of an embodiment of a computer system 30 that is in communication with or is part of the detection system 20, and that may perform various aspects of embodiments described herein. The computer system 30 includes at least one processing device 32, which generally includes one or more processors for performing aspects of radar detection and analysis methods described herein. The processing device 32 may be integrated into the vehicle 10, for example, as the on-board processor 24, or may be a processing device separate from the vehicle 10, such as a server, a personal computer or a mobile device (e.g., a smartphone or tablet). For example, the processing device 32 may be part of, or in communication with, one or more engine control units (ECU), one or more vehicle control modules, a cloud computing device, a vehicle satellite communication system and/or others. The processing device 32 may be configured to perform radar detection and analysis methods described herein and may also perform functions related to control of various vehicle subsystems.

Components of the computer system 30 include the processing device 32 (such as one or more processors or processing units) and a system memory 34. The system memory 34 may include a variety of computer system readable media. Such media may be any available media that is accessible by the processing device 32, and includes both volatile and non-volatile media, removable and non-removable media.

For example, the system memory 34 includes a non-volatile memory 36 such as a hard drive, and may also include a volatile memory 38, such as random access memory (RAM) and/or cache memory. The computer system 30 may further include other removable/non-removable, volatile/non-volatile computer system/readable storage media. A computer system/readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

The system memory 34 may include at least one program product having a set (e.g., at least one) of program modules that are configured to carry out functions of the embodiments described herein. For example, the system memory 34 stores various program modules 40 that generally carry out the functions and/or methodologies of embodiments described herein. For example, a receiver module 42 may be included to perform functions related to acquiring and processing received signals, and an analysis module 44 may be included to perform functions related to position estimation and range finding. The system memory 34 may also store various data structures 46, such as data files or other structures that store data related to radar detection and analysis. Examples of such data include sampled return signals, radar impulse response, the array beam pattern, frequency data, range-Doppler plots, range maps, and object position, velocity and/or azimuth data. As used herein, the term "module" refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

The processing device 32 may also communicate with one or more external devices 48 such as a keyboard, a pointing device, and/or any devices (e.g., network card, modem, etc.) that enable the processing device 32 to communicate with one or more other computing devices. In addition, the processing device 32 may communicate with one or more devices that may be used in conjunction with the detection system 20, such as a Global Positioning System (GPS) device 50 and a camera 52. The GPS device 50 and the camera 52 may be used, for example, in combination with the detection system 20 for autonomous control of the vehicle 10. Communication with various devices may occur via Input/Output (I/O) interfaces 54.

The processing device 32 may also communicate with one or more networks 56 such as a local area network (LAN), a general wide area network (WAN), and/or a public network (e.g., the Internet) via a network adapter 58. It should be understood that although not shown, other hardware and/or software components could be used in conjunction with the computer system 30. Examples include, but are not limited to: microcode, device drivers, redundant processing units, external disk drive arrays, RAID systems, and data archival storage systems, etc.

Figure 3:
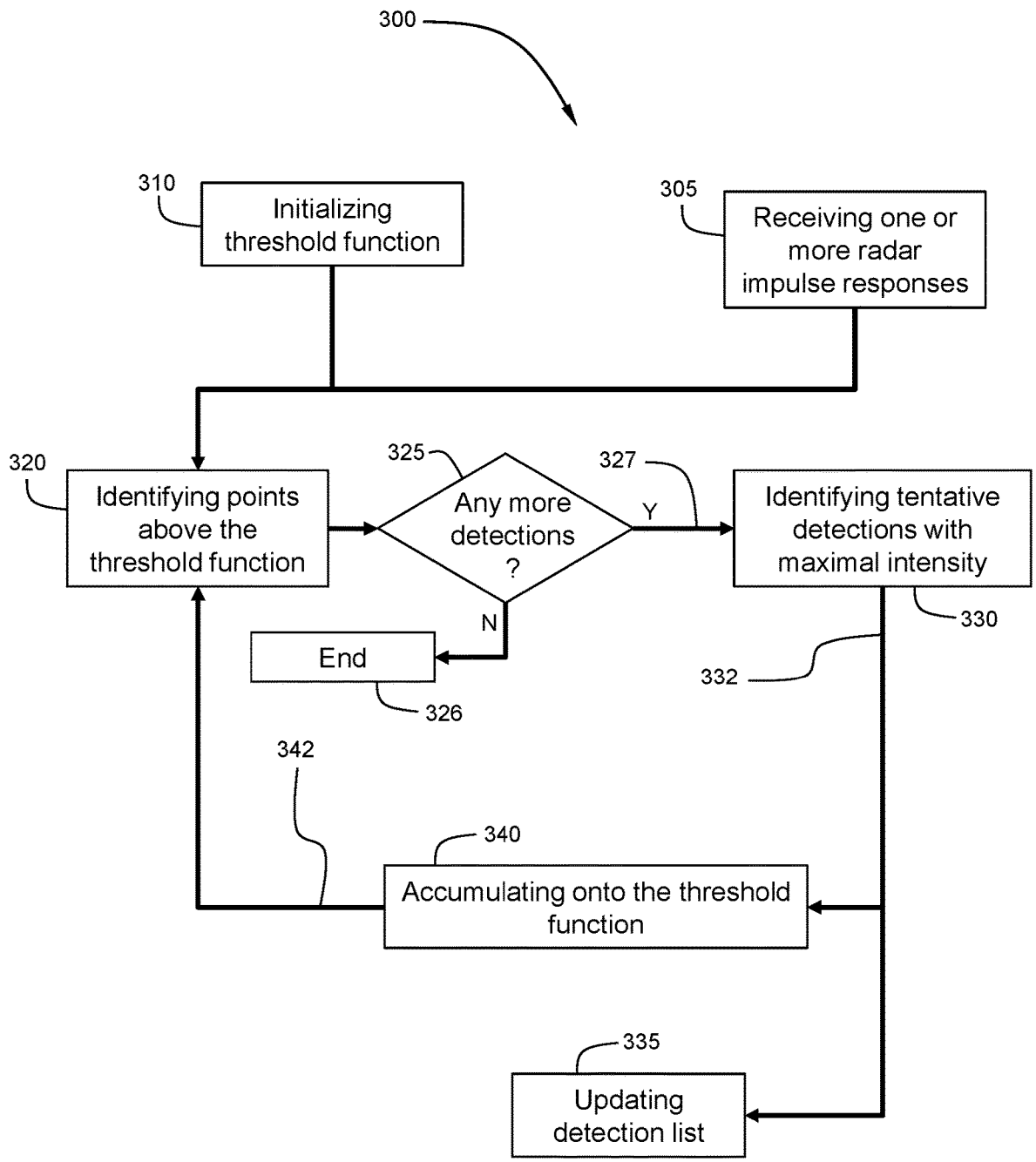
FIG. 3 depicts a process flow depicting a method of detection of accurate reflection points in the presence of high side-lobes, in accordance with one or more embodiments.

FIG. 3 illustrates aspects of an embodiment of a process flow 300 of the detection system 20 of FIG. 1 (e.g., a computer-implemented method), which includes detection of accurate reflection points in the presence of high side-lobes, in accordance with one or more embodiments. In this regard, the process flow 300 may be performed by a processor or processors disposed in or in communication with a vehicle 10 of FIG. 1 (e.g., an on-board processor 24 and/or a remote processor 26). The process flow 300 is discussed in conjunction with the detection system 20 of FIG. 1 and components shown in FIG. 2 for illustration purposes. Further, the process flow 300 is discussed in conjunction with a sparse array 400 of radar device 22 shown in FIG. 4 and the various exemplary graphs of FIG. 5. It is noted that aspects of the process flow 300 may be performed by any suitable processing device or system.

Figure 4:
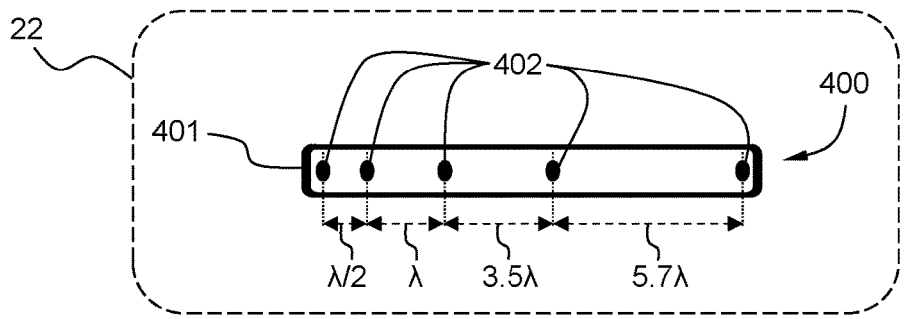
FIG. 4 depicts an exemplary sparse array radar antenna, in accordance with one or more embodiments.
Figure 5:
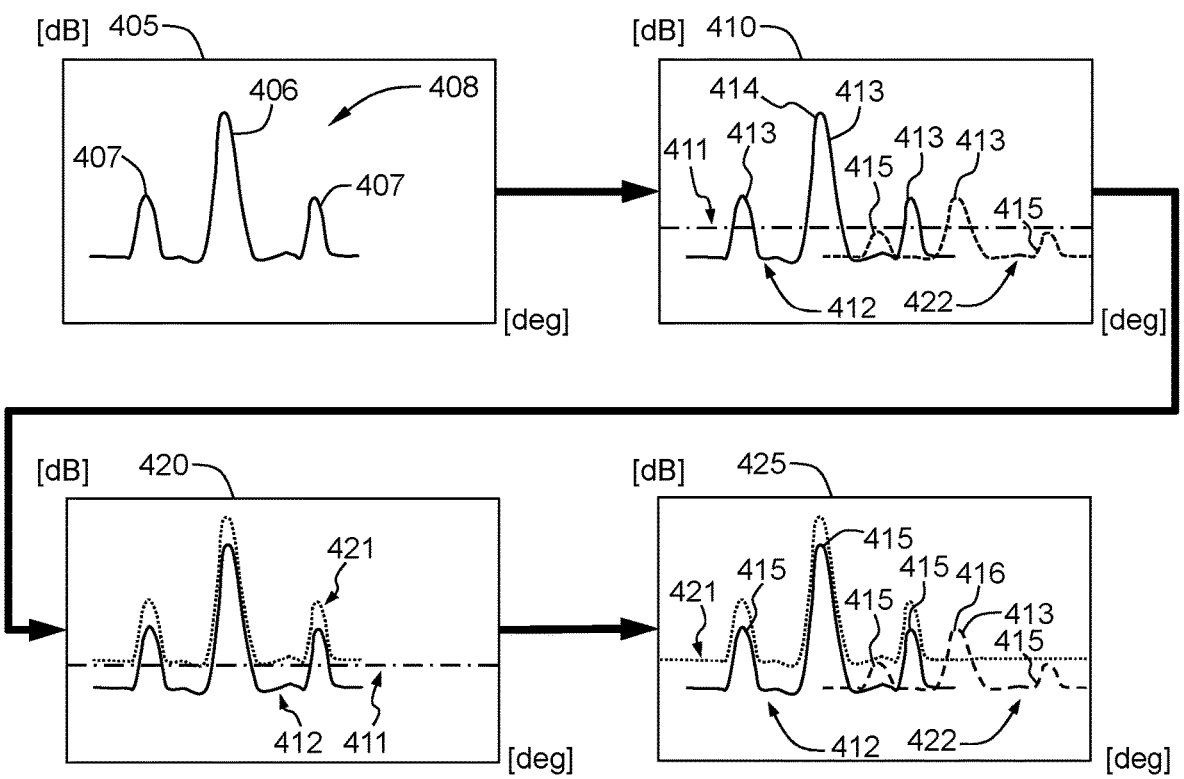
FIG. 5 depicts graphs illustrating threshold determinations, in accordance with one or more embodiments.

The process flow 300 begins at block 305, where a sparse array receives return radar signals reflected from reflection points of one or more targets. For example, the radar sensing assembly 22 may include an exemplary sparse array 400 as shown in FIG. 4. The sparse array 400 may include an aperture 401 and a plurality of linearly arranged antennas 402 having an average spacing larger than half a wavelength $\lambda$. The one or more received signals pass through the aperture 401 and are received by the one or more antennas 402 whereafter they are subjected to a beamforming operation. One exemplary beamforming operation may include the Bartlett beamforming algorithm. Alternative beamforming algorithms may be employed within the scope of the present disclosure, the Bartlett beamforming algorithm being merely exemplary and not limiting. The output of the beamforming operation for each received radar signal may be referred to as a beamforming spectrum which is generally represented as relative power as a function of the direction to the antenna. Where there are multiple targets, the output of the beamforming operation is a superposition of individual impulse responses from all corresponding reflection points. For purposes of this disclosure, beamforming spectrum and impulse responses may be generally represented graphically as a plot of relative power along a vertical axis [dB] vs. angle along a horizontal axis [deg]. For example, beamforming spectrums, such as the single target impulse response 408 illustrated in graph 405 of FIG. 5, may include a main lobe 406 and one or more side lobes 407. In accordance with one or more embodiments, a beamforming spectrum including superposed multiple target impulse responses is processed sequentially through multiple iterations of blocks 320, 325, 330, 335 and 340.

At block 310, an initial power threshold may be set. The initial threshold may be set automatically or by a user to a value above, for example, an average noise energy level. In accordance with one or more embodiments, the initial threshold 411 in graph 410 of FIG. 5 may be set logically by the software or firmware programs within a radar sensing assembly 22 of FIG. 1, or by a user who manually configures a radar sensing assembly 22. The initial threshold 411 may be set prior to the operations of block 305. The initial threshold 411 may be set by the software or firmware of the radar sensing assembly 22 to 8 dB above noise variance for example. In some cases, the software or firmware may be initialized by using a default fixed low level threshold marginally above noise variance. A low level threshold may be about 8 dB or less above noise variance. An initial threshold 411 is understood to be substantially fixed at all angles as illustrated by the horizontal, broken line setting shown in graph 410.

At block 320, all points of a beamforming spectrum that are above an active threshold are identified. The operations of block 320 may be considered a first stage to obtain tentative detections of all points of the beamforming spectrum above the active threshold. In a first iteration, the active threshold is the fixed initial threshold 411. Thus, with reference to graph 410, beamforming spectrum of a superposed first impulse response 412 (solid trace) and second impulse response 422 (dashed trace) is evaluated for points exceeding the fixed initial threshold 411. It is appreciated that graph 410 illustrates main and side lobes for each of the first impulse response 412 and the second impulse response 422. Lobes 413 contain points that exceed the fixed initial threshold 411 and each lobe 413 has a corresponding peak point considered to be a tentative detection point. The fixed initial threshold 411 being set above noise variance ensures tentative detections above the noise level. Lobes 415 contain no points above the fixed initial threshold and therefore are not considered for tentative detections.

Thus, at block 320, the active threshold establishes a first stage metric for determining peak points corresponding to tentative detections where each tentative detection point corresponds to each peak's point above the active threshold. In an initial iteration, the active threshold corresponds to the fixed initial threshold 411. Process flow 300 receives at decision block 325 the results from block 320. If no tentative detection points are determined at block 320, then decision block 325 directs process flow 300 to block 326 where the process flow ends. Otherwise, the tentative detection points determined at block 320 are provided to further operations of the software or firmware program within the radar sensing assembly 22, and the process flow 300 proceeds to a second stage block 330.

At block 330, tentative detection points with greatest relative power are identified. In operation, as shown on graph 410 of FIG. 5, the main lobe 414 of the first impulse response 412 of the beamforming spectrum corresponds to the tentative detection with the peak point having the greatest relative power. Thus, this tentative detection point at lobe 414 is designated in the current iteration at this second stage as a first certain detection point. The second stage of block 330 therefore determines for an iteration a certain detection point corresponding to the first stage tentative detection point having the greatest relative power. This tentative detection point with greatest relative power is considered to have the highest reliability from among the tentative detection points in the current iteration and is therefore determined to be the first certain detection point.

The first certain detection point and its corresponding relative power and angle are then provided to further operations of the software or firmware program within the radar sensing assembly 22 at block 335 and block 340.

At block 335, the first certain detection point and its corresponding relative power and angle are added to a detection list, for example, stored in the system memory 34 of the vehicle 10 of FIG. 1.

At block 340, the first impulse response 412 in the present example and iteration is accumulated onto the active threshold (i.e., the fixed initial threshold 411 in the present example and iteration). In this regard, the first impulse response 412 is centered at the angle of the certain detection point from block 330 and the fixed initial threshold 411 is multiplied by the relative power of the first impulse response 412. In accordance with one or more embodiments, as shown in graph 420 of FIG. 5, the fixed initial threshold 411 and the product of this multiplication are summed and an updated threshold 421 is generated from the accumulation. The updated threshold 421 is provided to further operations of the software or firmware program within the radar sensing assembly 22 at block 320 for subsequent use in at least another iteration.

At block 320, a next iteration of the process flow 300 begins. In accordance with one or more embodiments, for an exemplary second iteration of block 320, all points of the beamforming spectrum are evaluated for points exceeding the updated threshold 421. It is appreciated that graph 425 illustrates main and side lobes for each of the first impulse response 412 and the second impulse response 422 that were, in the previous iteration, compared against the fixed initial threshold 411 as described herein. It is now appreciated that with the updated threshold as described, the first impulse response 412 main and side lobes will be below the updated threshold 421. In the present example in graph 425 of FIG. 5, the lobe 413 contains points that exceed the updated threshold 421 and has a corresponding peak point considered to be a tentative detection point for the current iteration. Lobes 415 contain no points above the updated threshold 421 and therefore are not considered for tentative impulse response detections in the current iteration. Thus, at block 320, the active threshold establishes the active iteration's first stage metric for determining peak points corresponding to tentative detections where each tentative detection point corresponds to each peak's point above the active threshold. In this current iteration, the active threshold corresponds to the updated threshold 421. Process flow 300 receives at decision block 325 the results from block 320. If no tentative detection points for the current iteration are determined at block 320, then decision block 325 directs process flow 300 to block 326 ending the process flow. Otherwise, the tentative detection points for the current iteration determined at block 320 are provided to further operations of the software or firmware program within the radar sensing assembly 22, and the process flow 300 proceeds to a second stage block 330 for the current iteration.

At block 330, tentative detection points for the current iteration with greatest relative power are identified. In operation, as shown on graph 425 of FIG. 5, the main lobe 416 of the second impulse response 422 of the beamforming spectrum corresponds to the tentative detection for the current iteration with the peak point having the greatest relative power. Thus, this tentative detection point at lobe 416 is designated in the current iteration at this second stage as a second certain detection point. This tentative detection point with greatest relative power is considered to have the highest reliability from among the tentative detection points in the current iteration and is therefore determined to be the first certain detection point.

The second certain detection point and its corresponding relative power and angle are then provided to further operations of the software or firmware program within the radar sensing assembly 22 at block 335 and block 340.

At block 335, the second certain detection point and its corresponding relative power and angle are added to a detection list, for example, stored in the system memory 34 of the vehicle 10 of FIG. 1.

At block 340, the second impulse response 422 of the multiple target impulse response in the present example and iteration is accumulated onto the active threshold (i.e., the updated threshold 421 in the present example and iteration). In this regard, the second impulse response 422 is centered at the angle of the second certain detection point from block 330 and the active threshold is multiplied by the relative power of the second impulse response 422. In accordance with one or more embodiments, active threshold and the product of this multiplication are summed and generate from the accumulation a new threshold for a subsequent iteration. This new threshold is provided to further operations of the software or firmware program within the radar sensing assembly 22 at block 320 for subsequent use in at least another iteration.

Thus, it is appreciated that successive iterations update the threshold against which detection points are determined. Threshold updates are accomplished as a function of the prior iteration's detected points and effectively functions to filter out previously detected points and respective impulse response side lobes during current iteration detection point determinations.

Embodiments herein may be a system, a method, and/or a computer program product at any possible technical detail level of integration. The computer program product may include a computer readable storage medium (or media) having computer readable program instructions thereon for causing a processor to carry out aspects of the embodiments herein.

The computer readable storage medium may be a tangible device that may retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the embodiments herein may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the embodiments herein.

Aspects of the embodiments herein are described herein with reference to flowchart illustrations and/or block diagrams of methods, apparatus (systems), and computer program products according to embodiments herein. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that may direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which includes one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A radar system, comprising:
   a radar device comprising a sparse array receive element receiving a return radar signal; and
   a processing device:
      subjecting the return radar signal to a beamforming operation to produce a beamforming spectrum comprising superposed impulse responses comprising relative power and angle, each impulse response comprising a respective main lobe and respective side lobes;
      comparing the beamforming spectrum to a first power threshold and determining first tentative detection points as peak power points in the beamforming spectrum exceeding the first power threshold at respective angles;
      determining a first certain detection point as the one of the first tentative detection points having the greatest relative power;
      generating an updated power threshold comprising centering the impulse response related to the first certain detection point around the angle of the first certain detection point, multiplying the relative power of the first certain detection point by the impulse response related to the first certain detection point, and summing the product with the first power threshold;
      comparing the beamforming spectrum to the updated power threshold and determining second tentative detection points as peak power points of the beamforming spectrum exceeding the updated power threshold at respective angles; and
      determining a second certain detection point as the one of the second tentative detection points having the greatest relative power.

2. The radar system of claim 1, further comprising the processing device storing the first certain detection point and the second certain detection point in a memory.

3. The radar system of claim 1, wherein the first certain detection point corresponds to a first target and the second certain detection point corresponds to a second target.

4. The radar system of claim 1:
   wherein the beamforming spectrum comprises two superposed impulse responses; and
   wherein the first tentative detection points correspond to main lobes of both impulse responses and the second tentative detection points correspond to a main lobe of one of the impulse responses.

5. The radar system of claim 4, wherein the first certain detection point corresponds to one of the two superposed impulse responses and the second certain detection point corresponds to the other of the two superposed impulse responses.

6. The radar system of claim 1, wherein multiplying the relative power of the first certain detection point by the impulse response related to the first certain detection point comprises multiplying by the main lobe of the impulse response related to the first certain detection point.

7. The radar system of claim 1, wherein multiplying the relative power of the first certain detection point by the impulse response related to the first certain detection point comprises multiplying by the side lobes of the impulse response related to the first certain detection point.

8. The radar system of claim 1, wherein the first power threshold comprises a fixed power threshold at all angles of the beamforming spectrum.

9. A radar system, comprising:
a radar device comprising a sparse array receive element receiving a return radar signal; and
a processing device configured to:
subject the return radar signal to a beamforming operation to produce a beamforming spectrum comprising superposed impulse responses comprising relative power and angle, each impulse response comprising a respective main lobe and respective side lobes; and
iteratively execute a detection routine comprising:
performing a first stage detection comprising comparing the beamforming spectrum to an active power threshold and determining tentative detection points as peak power points in the beamforming spectrum exceeding the active power threshold at respective angles;
performing a second stage detection comprising determining a certain detection point as the one of the tentative detection points having the greatest relative power; and
updating the active power threshold for a subsequent iterative execution of the detection routine by centering the impulse response related to the certain detection point around the angle of the certain detection point, multiplying the relative power of the certain detection point by the impulse response related to the certain detection point, and summing the product with the active power threshold.

10. The radar system of claim 9, the detection routine further comprising storing the certain detection point in a memory.

11. The radar system of claim 9, wherein each impulse response corresponds to a respective target.

12. The radar system of claim 9:
wherein the tentative detection points correspond to lobes of the impulse responses.

13. The radar system of claim 9:
wherein multiplying the relative power of the certain detection point by the impulse response related to the certain detection point comprises multiplying by the main lobe of the impulse response related to the certain detection point.

14. The radar system of claim 9:
wherein multiplying the relative power of the certain detection point by the impulse response related to the certain detection point comprises multiplying by the side lobes of the impulse response related to the certain detection point.

15. The radar system of claim 9, wherein the active power threshold during a first iterative execution of the detection routine comprises a fixed power threshold at all angles of the beamforming spectrum.

16. A method of object detection with a radar system, comprising:
receiving a return radar signal with a radar device comprising a sparse array receive element;
subjecting the return radar signal to a beamforming operation to produce a beamforming spectrum comprising superposed impulse responses comprising relative power and angle, each impulse response comprising a respective main lobe and respective side lobes;
comparing the beamforming spectrum to a first power threshold and determining first tentative detection points as peak power points in the beamforming spectrum exceeding the first power threshold at respective angles;
determining a first certain detection point as the one of the first tentative detection points having the greatest relative power;
generating an updated power threshold comprising centering the impulse response related to the first certain detection point around the angle of the first certain detection point, multiplying the relative power of the first certain detection point by the impulse response related to the first certain detection point, and summing the product with the first power threshold;
comparing the beamforming spectrum to the updated power threshold and determining second tentative detection points as peak power points of the beamforming spectrum exceeding the updated power threshold at respective angles; and
determining a second certain detection point as the one of the second tentative detection points having the greatest relative power.

17. The method of object detection with a radar system of claim 16, comprising:
storing the first certain detection point and the second certain detection point in a memory.

18. The method of object detection with a radar system of claim 16:
wherein the first certain detection point corresponds to a first target and the second certain detection point corresponds to a second target.

19. The method of object detection with a radar system of claim 16:
wherein the beamforming spectrum comprises two superposed impulse responses; and
wherein the first tentative detection points correspond to main lobes of both impulse responses and the second tentative detection points correspond to the main lobe of one of the impulse responses.

20. The method of object detection with a radar system of claim 16:
wherein the first power threshold comprises a fixed power threshold at all angles of the beamforming spectrum.

* * * * *